June 29, 1965  H. G. WRIGHT  3,192,441
MEANS FOR PROTECTING REGULATED POWER SUPPLIES
AGAINST THE FLOW OF EXCESSIVE CURRENTS
Filed July 2, 1962  3 Sheets-Sheet 1

PRIOR ART

INVENTORS
HARRISON G. WRIGHT
BY
*Ernest L. Brown*
ATTORNEY

INVENTORS
HARRISON G. WRIGHT
BY
Ernest L Brown
ATTORNEY

INVENTORS
HARRISON G. WRIGHT
BY
Ernest L. Brown
ATTORNEY

United States Patent Office 3,192,441
Patented June 29, 1965

3,192,441
MEANS FOR PROTECTING REGULATED POWER SUPPLIES AGAINST THE FLOW OF EXCESSIVE CURRENTS
Harrison G. Wright, Yorba Linda, Calif., assignor to North American Aviation, Inc.
Filed July 2, 1962, Ser. No. 206,599
18 Claims. (Cl. 317—33)

This invention pertains to a means for protecting regulated power supplies against the flow of excessive currents. More particularly, this invention pertains to a means for protecting transistorized, voltage-regulated power supplies against the excessive flow of current through their controlling transistors and for automatically reducing the output voltage to zero until the device of this invention is reset.

In digital computers and data handling systems it is necessary to generate controlled voltages which vary only between narrow limits regardless of the amount of normal load upon the power supply.

In the device of this invention, an overload causes the power supply output voltage to be reduced substantially to zero. The overload then can be detected by latching or holding the power supply output voltage near zero until the overload is observed by the operator and the device of this invention is reset.

When a short circuit or overload occurs, it is desirable to open the current-controlling valves or transistors of the regulated supply by affecting their bias voltage. Numerous circuits have been devised to cause the current-controlling valves or transistors to block or limit the flow of current to the load when a short circuit or overload occurs. If a series regulator comprising transistors or valves is not opened rapidly enough, the regulating transistor or valve is destroyed. The circuit of this invention is constructed to achieve the result of rapidly opening of the regulating valve or transistor to prevent damaging of either the power supply or the current regulating valve or transistor and also to keep the valve or transistor open until the overload is observed by the operator and the device of this invention is deliberately reset to normal operation.

The circuits which are shown and described in this application utilize a transistorized feed-back amplifier, connected by its input terminals to a voltage source whose voltage is proportional to the voltage across the output terminals of the power supply (for example, by means of a voltage divider) and whose output is connected to control the operation of a series regulator which is positioned between an unregulated direct current voltage source and a load which is across the output terminals of the regulated power supply.

The circuit contemplated by this invention uses a controlled rectifier (e.g., silicon controlled rectifier) which is connected to the controlling input terminal (e.g. grid of a tube or base of a transistor) of a series controlling regulator to modify the controlling potential of the series regulator, to incapacitate the regulator, to cause the regulating transistors to cease conducting current to the load attached to the output terminals of the regulated voltage supply. The control electrode of the controlled rectifier and the cathode of the controlled rectifier are connected to opposite terminals of a current-sensing resistor which is connected in series with the flow of current to the output terminals of the power supply. Thus, when the flow of current becomes excessive, the control electrode of the controlled rectifier causes the rectifier to conduct current in its anode-cathode current path, which modifies the input voltage on the first stage, or transistor, of the series regulator to control the flow of current to the load in a fashion to reduce substantially to zero the voltage across the load. The modifying of the voltage at the control terminals of the series regulator causes the transistors of the regulator to be forced or controlled, in a predetermined length of time, to open the current path to the output teminals of the power supply.

A switch, which may be opened momentarily, is connected in series with the anode-cathode current path of the controlled rectifier to interrupt the anode-cathode current, then to re-close to reconnect the anode-cathode current path into the circuit. The momentary interruption of the current flow in the anode-to-cathode circuit causes the device to reset. If, when the swtich is reclosed, the short circuit persists, the cotnrolled rectifier will again conduct to protect the power supply. The time during which the switch is open must be sufficiently long to extinguish the current flow through the anode-to-cathode circuit of the controlled rectifier, but not long enough for the short circuit current to rebuild to an excessive value before the switch is again closed.

The conduction of the controlled rectifier reduces the output voltage of the power supply substantially to zero. However, because the anode-to-cathode voltage drop during conduction of the controlled rectifier is not zero, control of the control voltage of the series regulator amplifier is not complete and a small output voltage exists across the power supply output terminals. Compensating means are introduced to reduce the output voltage more closely to a true zero. To this end, diodes are introduced at significant points within the circuits to compensate for the finite forward-conduction voltage of the controlled rectifier.

The critical voltage of the control electrode of the controlled rectifier is very sensitive to temperature. That is, as the temperature changes the amplitude of the voltage which must be applied to the control electrode of the controlled rectifier to cause conduction of the controlled rectifier varies. Resistor, diode, and active voltage compensation is introduced to cause the controlled rectifier to be controlled consistently at substantially the same value of current overload.

It is also desirable that the controlled rectifier should not conduct during the presence of starting transients that are charging the output capacitor. Appropriate time delays are introduced by resistance-capacitance networks to prevent impulses of current from causing the controlled rectifier to conduct.

It is, therefore, an object of this invention to prevent excessive flow of current to the output terminals of a controlled voltage power supply.

It is another object of this invention to protect the components of power supply from excessive flow of current.

Other objects will become apparent from the following description taken in connection with the accompanying drawings in which.

Figure 1:
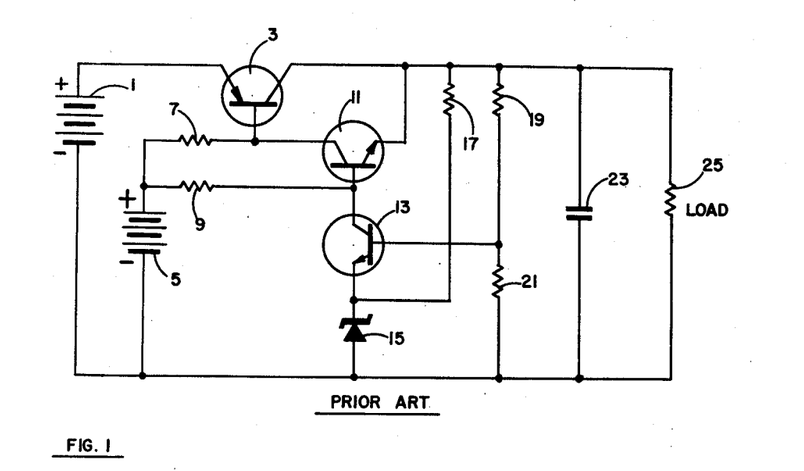
FIG. 1 is a schematic diagram, in accordance with the prior art, of a series-connected voltage-regulated power supply with a load across its output terminals.

In the regulated power supply of FIG. 1, in accordance with the prior art, an unregulated voltage source 1 is connected by its positive terminal to the emitter of a PNP transistor 3. Voltage source 5, which has a larger voltage magnitude than that of source 1, is connected by its positive terminal through a voltage dropping resistor 7 to the base of transistor 3. The collector of transistor 3 is connected to the positive output terminal of the power supply and to load resistor 25. The positive terminal of voltage source 5 is connected through a voltage dropping resistor 9 to the base of NPN transistor 11 and the collector of NPN transistor 13. The base of PNP transistor 3 and the collector of NPN transistor 11 are connected together. The emitter of NPN transistor 11 is connected to the positive output terminal of the power supply. The emitter of NPN transistor 13 is connected to the junction at the series connection between resistor 17 and zener-diode 15. Zener-diode 15 is connected with its cathode toward the emitter of transistor 13 and its anode toward the negative output terminal of the power supply. The base of transistor 13 is connected to the junction of voltage dividing resistors 19 and 21, which are connected across the output terminals of the power supply. Capacitor 23 is a filter capacitor used to lower the output impedance at high frequencies.

In the prior art circuit of FIG. 1, when the voltage rises across the output terminals of the power supply, the base of transistor 13 becomes more positive with respect to its emitter to increase the collector-emitter current. The increase of collector-emitter current of transistor 13 causes the base of transistor 11 to become less positive in voltage which decreases the collector-emitter current of transistor 11. The decrease of collector-emitter current of transistor 11 causes the base of transistor 3 to become more positive in voltage which decreases the current from the emitter to the collector of transistor 3. The current flow from the emitter to the collector of transistor 3 is thus controlled to cause the voltage across the output terminals of the power supply to be maintained at a substantially constant value. Transistor 13, is a feed-back amplifier with its input control terminal responsive to the output voltage of the power supply and with its output connected to the control terminal of the series regulator (transistors 11 and 3) to control the flow of current to the output terminals of the power supply.

Figure 2:
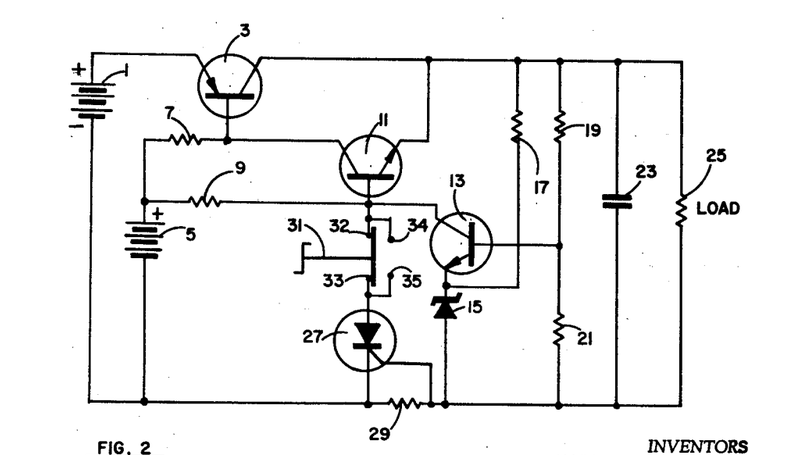
FIG. 2 is a circuit diagram, in accordance with this invention, showing the connection of a controlled rectifier to the circuit of FIG. 1.

In the circuit of FIG. 2, in accordance with this invention, a saturable element, such as a controlled rectifier of the NPNP type is connected by its anode to the base of transistor 11 and by its cathode to the common negative terminal of voltage sources 1 and 5. A switch 31 is connected in series with the anode-cathode current path of controlled rectifier 27. A current sensing resistor 29 is connected in series with the current path to the output terminals of the power supply. The control electrode of controlled rectifier 27 is connected to the negative output terminal of the power supply to cause a voltage to appear, between the cathode and control electrode of controlled rectifier 27, in proportion to the magnitude of the current flow to the output terminals of the power supply.

Controlled rectifier 27 may be, for example, a silicon controlled rectifier. A characteristic of an NPNP silicon controlled rectifier is that when a voltage, which is positive with respect to the cathode of the rectifier, is applied to the anode of the rectifier, the impedance to flow of anode-cathode current is high until the voltage applied to the control electrode of the rectifier reaches a predetermined critical positive magnitude with respect to the cathode. When the voltage between the control electrode and the cathode reaches its critical value, the anode-to-cathode impedance is reduced to a low value and a current flows from the anode to the cathode of the controlled rectifier. If the voltage between the control electrode and the cathode is then made to be less positive with a magnitude below its critical value after a current flow occurs between the anode and cathode of the controlled rectifier, no reduction in the anode-cathode current occurs. The anode-cathode current must be interrupted or reduced below a certain value before the device can reset and present a high impedance again to block the flow of current through the controlled rectifier.

To interrupt the anode-cathode current of the controlled rectifier 27, a switch 31 is connected in series with the anode-cathode current path. The switch 31 should be preferably of the type which opens only momentarily then recloses to reset the action of the controlled rectifier. The time during which the switch 31 is open before it resets should be sufficient to interrupt the current flow in the anode-cathode current path but not long enough to cause the current flowing to the output terminals of the power supply to cause excessive heating of the series transistor 3. The switch 31 may be an electronically controlled switch or a mechanically actuated switch. It may be remotely controlled or locally controlled. As shown in the example of FIG. 2, the conducting element of switch 31 connects terminals 32 and 33 or terminals 34 and 35 together in either closed position.

When the current flow to the output terminals of the power supply is not excessive, the voltage between the control electrode and the cathode of controlled rectifier 27 is less than the critical voltage magnitude and rectifier 27 does not conduct in its anode-to-cathode current path. The voltage regulator operates after the fashion of the operation of the circuit shown in FIG. 1, and described above. When, however, the current to the output terminals of the power supply exceeds a predetermined critical value, the voltage drop across current sensing resistor 29 reaches the critical voltage magnitude of the controlled rectifier 27 to cause rectifier 27 to conduct in its anode-to-cathode current path. When rectifier 27 conducts from its anode-to-cathode, the base of transistor 11 is connected through the relatively low voltage drop of the controlled rectifier 27 to the negative side of the power supply to cause the emitter of transistor 11 to follow its base in voltage to cause the control voltage of the series regulator to be modified and made more negative which turns off the collector current of transistor 11. The turning off of the collector current of transistor 11 causes transistor 3 to cease conducting in its emitter-to-collector path. Thus, an excessive flow of current through resistor 29 causes the circuit to the load 25 to be opened.

The conducting of controlled rectifier 27 in its anode-to-cathode path may be used, by circuit means not shown, to signal an alarm. For example, the radical change in voltage drop across resistor 9 or across rectifier 27 may be used to trigger an alarm circuit. The operator may then reset the controlled rectifier 27 by operating switch 31 or by turning the voltage supply 5 off and then on again. When switch 31 is actuated, for example, the conducting contacts may be moved from contacts 32 and 33 to contacts 34 and 35. During the time of transfer of the contacts the anode-cathode current path of rectifier 27 is opened. When the anode-cathode current path is reclosed, if the voltage between the control electrode and the cathode of rectifier 27 is below the critical voltage magnitude (which signifies that the short circuit or overload has been removed from the output terminals) the rectifier 27 does not re-conduct in its anode-to-cathode current path until another short circuit or overload occurs. Thus, the circuit of FIG. 2, in accordance with this invention, protects transistors 3 and 11, and particularly transistor 3, against the effects of excessive current flow.

One of the problems encountered with the circuit of FIG. 2 is that even when the controlled rectifier is conducting in its anode-to-cathode path, the anode-to-cathode voltage may have sufficient magnitude to prevent the blocking of the collector-to-emitter current of transistor 11.

To prevent conduction of current in the collector-to-emitter path of transistor 11, the base of transistor 11 must be maintained sufficiently near zero or negative to cut off transistor 11. One circuit for maintaining the base of transistor 11 at cut off when the anode-to-cathode path of controlled rectifier 27 is conducting, is to bias the cathode of the controlled rectifier 27 to a potential which is more negative than the potential of the emitter of transistor 11 when transistor 11 is not conducting.

Figure 3:
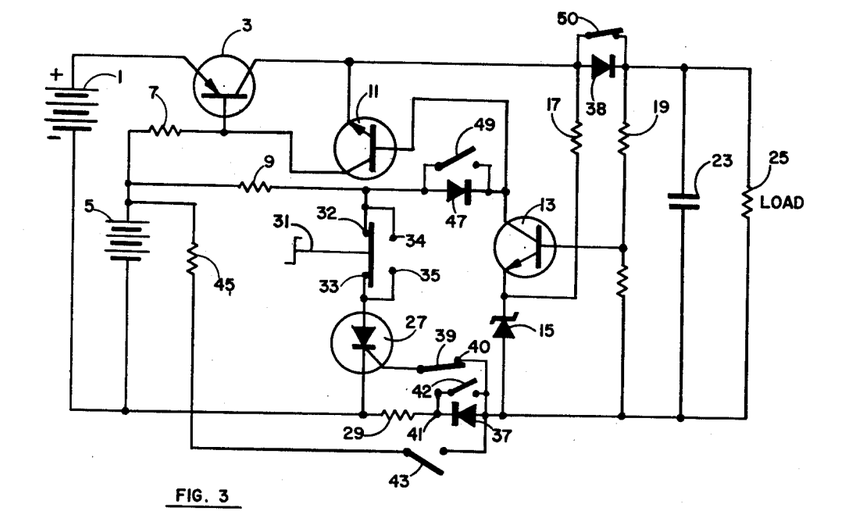
FIG. 3 is a circuit diagram, in accordance with this invention, together wtih compensating diodes positioned in various positions.

Referring to FIG. 3, with switches 49 and 50 closed, with switches 42 and 43 open, and with switch 39 connected to terminal 40, a diode 37 is connected between terminal 41 of current sensing resistor 29 and the negative output terminal of the power supply. Diode 37 is chosen so that its anode-to-cathode voltage during conduction is substantially equal in magnitude to the anode-to-cathode voltage of controlled rectifier 27 during its anode-to-cathode conduction. If these two voltages were perfectly matched, there would be no voltage between the base and emitter of transistor 11 when controlled rectifier 27 conducts in its anode-to-cathode path. In practice, it is desirable to make the magnitude of the voltage drop across diode 37 slightly greater than the magnitude of voltage drop across controlled rectifier 27 which causes transistor 11 to be back-biased when controlled rectifier 27 conducts.

In one alternative compensating arrangement, switch 39 can be connected to terminal 41, in which event the voltage drop across diode 37 does not appear between the cathode and the control electrode of controlled rectifier 27.

Even with transistors 3 and 11 back-biased, some leakage current always flows. However, in the event that there is insufficient leakage current, the forward biasing current through diode 37 may be supplied from voltage source 5 through a current limiting resistor 45 by closing switch 43.

In still another compensating embodiment, the compensating diode may be inserted in the positive output lead of the power supply between resistors 17 and 19, as shown at 38, by opening switch 50 and closing switch 42.

With a diode, such as diode 37, in the main current stream, the power handling capabilities of diode 37 must be very large. If a diode 47 is connected as shown in FIG. 3, with switch 49 open and with switch 42 closed, the anode voltage of the controlled rectifier 27, when conducting, is of the same magnitude as the sum of the voltage across diode 47 and the voltage between the base and emitter of transistor 11. That is, controlled rectifier 27 has a voltage drop between its anode and cathode when it conducts, but the voltage across diode 27 plus the base-to-emitter voltage of transistor 11 is equal to the voltage across rectifier 27. Therefore, diode 47 and transistor 11 are inhibited from conducting and transistor 11 is caused to be in or close to its cutoff operating region. Because diode 47 does not carry the full load current, it can be a smaller diode than if it were in the position of diodes 37 or 38.

Figure 4:
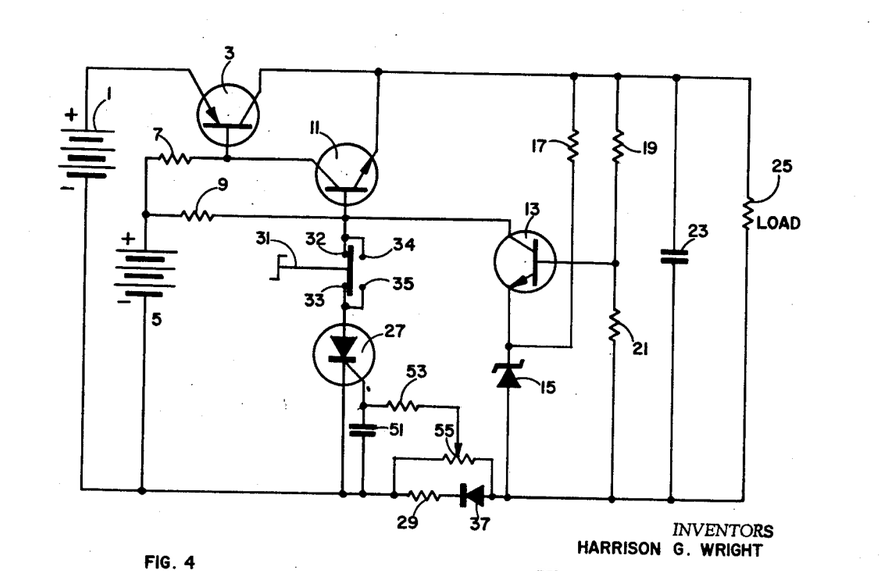
FIG. 4 is a circuit diagram of another embodiment of this invention.

In FIG. 4, diode 37 is connected in series with current sensing resistor 29. The fixed terminals of a potentiometer 55 (or resistor bridge) are connected across the extremities of the series combination of resistor 29 and diode 37. The movable arm of potentiometer 55 is connected through a resistor 53 to the control electrode of controlled rectifier 27. A capacitor 51 is connected between the control electrode and the cathode of controlled rectifier 27. In other respects the circuit of FIG. 4 is identical to the circuit of FIG. 2.

Turn-on transients in the circuit may cause impulses of current through diode 37 and resistor 29. An impulse of high current through resistor 29 and diode 37 ordinarily would cause controlled rectifier 27 to conduct in its anode-to-cathode current path. However, in the circuit of FIG. 4 the capacitor 51 must charge before the critical control voltage is applied to the control electrode of controlled rectifier 27. The time for charging of capacitor 51 depends upon the time constants of the circuit determined by the capacitance of capacitor 51 and the resistance of resistors 53 and part of potentiometer 55. For example, when voltage sources 1 and 5 are initially connected to the circuit, capacitor 23 appears to be a short circuit. After a short time, capacitor 23 is charged to its full voltage. Without capacitor 51 the surge of current could cause controlled rectifier 27 to conduct. The time constant associated with the control element of device 27 must be substantially longer than the time constant associated with capacitor 23. By moving the movable arm of potentiometer 55, controlled rectifier 27 may be caused to conduct at different predetermined values of load current.

Figure 5:
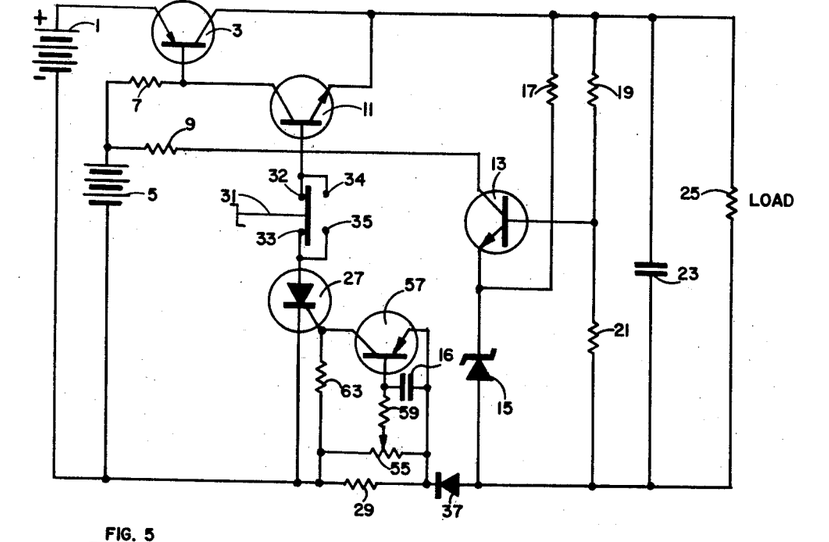
FIG. 5 is a circuit diagram of still another embodiment of this invention.

One of the difficulties with the circuit of FIG. 4 is that although capacitor 51 delays the initiation of the flow of current through controlled rectifier 27, it also delays the recovery time of controlled rectifier 27 when switch 31 is transferred from one pair of terminals 32–33 to a second pair of terminals 34–35. To overcome this difficulty, a transistor 57 is connected as shown in FIG. 5. In FIG. 5, the fixed terminals of potentiometer 55 are connected across current sensing resistor 29. Alternatively, the fixed terminals of potentiometer 55 could be connected across the series combination of diode 37 and resistor 29. A resistor 63 is connected between the control electrode and the cathode of controlled rectifier 27. The base of PNP transistor 57 is connected through a resistor 59 to the movable arm of potentiometer 55. The emitter of PNP transistor 57 is connected to the positive fixed terminal of potentiometer 55. A capacitor 16 is connected between the emitter and base of potentiometer 57. The collector of transistor 57 is connected to the control electrode of controlled rectifier 27. Transistor 57 isolates the time delay capacitor 16, which prevents controlled rectifier 27 from conducting during the turn-on transient, from the controlled rectifier 27. When a period of excessive current occurs through the load 25, capacitor 16 commences to charge through resistor 59 and resistor 55. As the voltage across capacitor 16 increases, the emitter-to-base current and the emitter-to-collector current of transistor 57 also increases. As the emitter-to-collector current of transistor 57 increases, the voltage across resistor 63 increases. When the voltage across resistor 63 reaches a critical value, it causes controlled rectifier 27 to conduct in its anode-to-cathode current path. After controlled rectifier 27 is conducting in its anode-to-cathode current path, if the load current decreases the emitter-to-collector current of transistor 57 decreases thereby lowering the voltage across resistor 63 and reducing the control-electrode-to-cathode voltage of controlled rectifier 27 below its critical value but not resetting rectifier 27. When switch 31 is momentarily opened, substantially no capacitance appears in the circuit of the control electrode to hold a charge which could re-close the anode-cathode path of rectifier 27 after switch 31 is re-closed.

Figure 6:
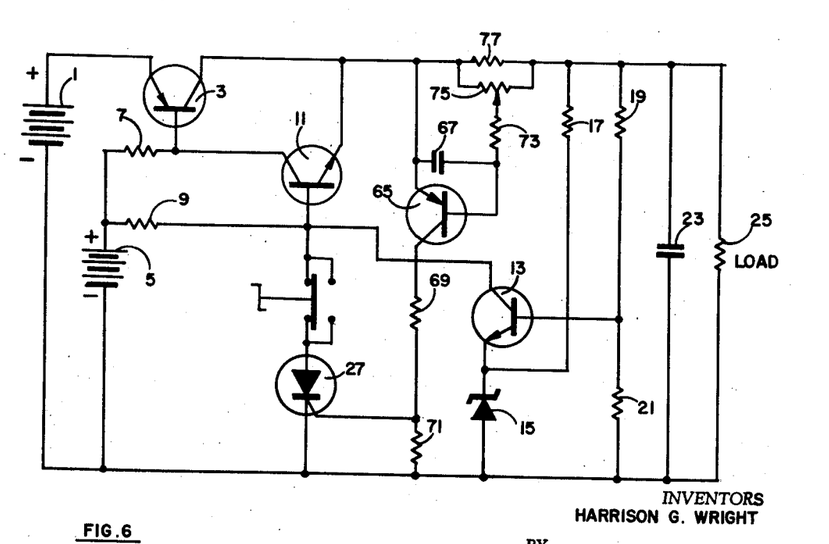
FIG. 6 is a circuit diagram of an embodiment of this invention with the current sensing resistor connected in an alternative position.

In FIG. 6, the sensing resistor 77 appears in the positive lead of the power supply. The fixed terminals of a potentiometer 75 are bridged across current sensing resistor 77. A PNP transistor 65 has its emitter connected to the positive end of current sensing resistor 77. The base of transistor 65 is connected through resistor 73 to the movable contact of potentiometer 75. A time delay capacitor 67 is connected between the emitter and the base of transistor 65. The collector of transistor 65 is connected through a voltage dividing resistor 69 and 71 to the negative terminal of the power supply. The control electrode of controlled rectifier 27 is connected to the junction between resistors 69 and 71. When an excessive current commences to flow through load 25 and capacitor 23, capacitor 67 starts to charge, thereby increasing the voltage between the emitter and base of transistor 65. The emitter-to-base current and the emitter-to-collector current of transistor 65 increases. The increase of collector current of transistor 65 raises the voltage across resistors 69 and 71 to cause the voltage across resistor 71 to assume a value which is above the critical voltage value of the control electrode of controlled rectifier 27. After the controlled rectifier conducts, the current through resistor 77 reduces and allows the device to be reset in the same manner as described in connection with the device of FIG. 5.

Thus, the device of this invention is a circuit which is adapted to prevent overloads of current from controlled voltage power supplies from damaging the components of the power supply.

It will be obvious to those persons skilled in the art that the polarity of the voltage sources could be reversed, provided the complementary types of transistors and the complementary type of controlled rectifier are used and provided that the potential of the diodes are reversed. Thus, the PNP transistors would need to become NPN transistors, the NPN transistors would need to become PNP transistors, each of the diodes would need its cathode to replace its anode and its anode to replace its cathode, and the controlled rectifier would need to be changed from an NPNP rectifier to a PNPN rectifier.

Although the invention has been described in detail above, it is to be understood that the invention is to be interpreted in accordance with the scope of the appended claims in which I claim:

1. In combination:
a series-connected regulator having a first pair of input terminals adapted to be connected to a voltage source and a pair of output terminals adapted to be connected to a load, said regulator having a multi-stage amplifier whose input is controlled in response to the voltage appearing across said output terminals and whose output is connected in series between said input and output terminals to control the flow of current to said load;
and a silicon controlled rectifier whose anode-cathode circuit is connected, in series with a switch, to the output of the first stage of said amplifier to modify the potentials to the output of said first stage to cause said amplifier to block the flow of current between said input and output terminals when said controlled rectifier conducts at saturation in its anode-to-cathode path, the conrol electrode of said control rectifier being connected to a voltage dividing network in series with said load, thereby to fire said silicon controlled rectifier and cause it to conduct at saturation in response to an overload of current between said input and output terminals.

2. In combination:
a series-connected regulator, including a multi-stage amplifier having the input of the first stage of said amplifier connected to be responsive to the voltage at the output terminals of said regulator and having the last stage of said amplifier connected in series between the input and output terminals of said regulator to valve the current flow between said input and said output terminals;
a silicon controlled rectifier, having its control electrode connected to a voltage dividing means in series with said output terminals, thereby to fire said controlled rectifier and cause it to saturate in response to an excess of current flow between said input and output terminals of said regulator and connected to back bias, when conducting, one of the stages of said amplifier to cause current flow to be blocked from said input to said output terminals of said regulator;
and switch means, connected to open momentarily the conducting circuit of said control rectifier.

3. In combination:
an electrical energy source;
a pair of output terminals adapted to be connected to an electrical energy sink;
electrical valve means connected between said source and said terminals;
a transistor having emitter, collector, and base electrodes, said base electrode being connected to a terminal whose potential is proportional to the potential across said electrical energy sink;
a first resistor in series with a zener-connected diode across said energy sink, the emitter of said transistor being connected to the junction of said zener-diode and said resistor;
the collector of said transistor being connected to control the flow of current through said electrical valve means;
a controlled rectifier having anode, cathode, and control electrodes, the anode-cathode circuit being connected to modify the collector potential of said transistor and to bias said electrical valve means when said control rectifier is conducting in its anode-cathode path;
the control electrode of said rectifier being connected to be responsive to an overload of current applied to said sink;
and switch means connected in series with the anode-cathode circuit of said controlled rectifier to open momentarily said anode-cathode circuit.

4. A device as recited in claim 3 and further comprising:
means for compensating for the voltage drop across the cathode-to-anode terminals of said controlled rectifier during conduction of said rectifier to cause the voltage applied to said load to be reduced substantially to zero during conduction of said rectifier.

5. Means for protecting power supplies against the flow of excess current comprising:
a first transistor having emitter, collector and base electrodes;
voltage dividing means having a voltage dividing tap, connected across the output terminals of said power supply to generate a voltage at said tap which is proportional to the voltage at the output terminals of said power supply, said tap being connected to the base electrode of said transistor;
a resistor and a zener-connected diode, connected in series across the output terminals of said power supply, the junction between said resistor and said diode being connected to the emitter of said transistor;
a current regulator, connected to be controlled in response to the current flow through the emitter-collector path of said transistor, said current regulator being connected in series with said output terminals to cause current flow to said output terminals to be blocked when said regulator is back-biased;
a controlled rectifier, connected to the collector of said transistor by its anode-cathode path to back-bias said transistor and said regulator when current flows in the anode-cathode current path of said rectifier, and having its control electrode connected to be responsive to an excessive flow of current to said output terminals.

6. Means for protecting power supplies against the excessive flow of current from their output terminals comprising:
a first and second resistor connected in series across the output terminals of said power supply;
a first transistor of a first type, having its base connected to the junction between said first and second resistors;
a third resistor and a zener-connected diode, connected in series across the output terminals of said power supply, the emitter of said first transistor being connected to the junction between said third resistor and said diode;

the collector of said first transistor being connected through a fourth resistor to a first source of electrical energy;

a second transistor of said first type having its base connected to the collector of said first transistor and its emitter connected to a first one of said output terminals;

the collector of said second transistor being connected through a fifth resistor to said first electrical energy source;

a third transistor of a type complementary to said first type having its base connected to the collector of said second transistor, its collector connected to the emitter of said second transistor, and its emitter connected to a second source of electrical energy;

a controlled rectifier, having its anode-to-cathode current path connected in series with a switch between the collector of said first transistor and a terminal common to said energy sources;

a current sensing resistor connected in series with the current flow to the output terminals, the control electrode of said rectifier being connected to sense the voltage generated by current flow through said current sensing resistor.

7. In combination:

a power supply having a regulated output D.C. voltage, including a pair of output terminals and a source of unregulated D.C. voltage;

first and second resistors connected in series across said output terminals;

a third resistor and a zener diode connected in series across said output terminals with said resistor connected to the positive output terminal;

a first transistor of NPN type having its base connected to the junction of said first and second resistors and its emitter connected to the junction of said third transistor and said zener diode, the collector of said transistor being connected through a fourth resistor to a positive terminal of said source of unregulated D.C. voltage;

a second transistor of NPN type having its base connected to the collector of said first transistor, its emitter connected to said positive output terminal, and its collector connected through a fifth resistor to said positive terminal of said source of unregulated D.C. voltage;

a third transistor of PNP type having its base connected to the collector of said second transistor, its collector connected to the emitter of said second transistor, and its emitter connected to a positive terminal of said source of unregulated D.C. voltage;

a controlled rectifier of NPNP type having its cathode connected to the negative terminal of said source of unregulated D.C. voltage, and its positive terminal connected to the collector of said first transistor;

switch means connected in series with the anode-cathode current path of said controlled rectifier to open momentarily said current path;

a current sensing resistor connected in series between the cathode of said controlled rectifier and the negative output terminal of said power supply, the control electrode of said rectifier being connected to the negative output terminals of said power supply;

a second diode, having a conducting voltage drop which is substantially equal to the conducting anode-cathode voltage drop of said controlled rectifier, connected in series with said current sensing resistor between the cathode of said controlled rectifier and the negative output terminal of said power supply.

8. In combination:

a power supply having a regulated output D.C. voltage, including a pair of output terminals and a source of unregulated D.C. voltage;

first and second resistors connected in series across said output terminals;

a third resistor and a zener-diode connected in series across said output terminals with said resistor connected to the positive output terminal;

a first transistor of NPN type having its base connected to the junction of said first and second resistors and its emitter connected to the junction of said third resistor and said zener-diode, the collector of said transistor being connected through a fourth resistor to a positive terminal of said source of unregulated D.C. voltage;

a second transistor of NPN type having its base connected to the collector of said first transistor, its emitter connected to said positive output terminal, and its collector connected through a fifth resistor to said positive terminal of said source of unregulated D.C. voltage;

a third transistor of PNP type having its base connected to the collector of said transistor, its collector connected to the emitter of said second transistor, and its emitter connected to a positive terminal of said source of unregulated D.C. voltage;

a controlled rectifier of NPNP type having its cathode connected to the negative terminal of said source of unregulated D.C. voltage, and its positive terminal connected to the collector of said first transistor;

switch means connected in series with the anode-cathode current path of said controlled rectifier to open momentarily said current path;

a current sensing resistor connected in series between the cathode of said controlled rectifier and the negative output terminal of said power supply, the control electrode of said rectifier being connected to the negative output terminal of said power supply;

a third diode having substantially the same conducting voltage drop as the conducting anode-to-cathode voltage drop of said controlled rectifier, connected with its cathode to the collector of said first transistor and to the base of said second transistor and with its anode to the anode of said controlled rectifier and to said fourth resistor.

9. In combination:

a power supply having a regulated output D.C. voltage, including a pair of output terminals and a source of unregulated D.C. voltage;

first and second resistors connected in series across said output terminals;

a third resistor and a zener-diode connected in series across said output terminals with said resistor connected to the positive output terminal;

a first transistor of NPN type having its base connected to the junction of said first and second resistors and its emitter connected to the junction of said third resistor and said zener-diode, the collector of said transistor being connected through a fourth resistor to a positive terminal of said source of unregulated D.C. voltage;

a second transistor of NPN type having its base connected to the collector of said first transistor, its emitter connected to said positive output terminal, and its collector connected through a fifth resistor to said positive terminal of said source of unregulated D.C. voltage;

a third transistor of PNP type having its base connected to the collector of said second transistor, its collector connected to the emitter of said second transistor, and its emitter connected to a positive terminal of said source of unregulated D.C. voltage;

a controlled rectifier of NPNP type having its cathode connected to the negative terminal of said source of unregulated D.C. voltage, and its anode connected to the collector of said first transistor;

switch means connected in series with the anode-cathode current path of said controlled rectifier to open momentarily said current path;
a current sensing resistor connected in series between the cathode of said controlled rectifier and the negative output terminal of said power supply, the control electrode of said rectifier being connected to the negative output terminal of said power supply;
a second diode having substantially the same conducting voltage drop as the conducting anode-to-cathode voltage drop of said controlled rectifier, connected in series with said current sensing resistor between the cathode of said controlled rectifier and the negative terminal of said power supply, the control electrode of said controlled rectifier being connected to the junction between said current sensing resistor and said second diode.

10. In combination:
a power supply having a regulated output D.C. voltage, including a pair of output terminals and a source of unregulated D.C. voltage;
first and second resistors connected in series across said output terminals;
a third resistor and a zener-diode connected in series across said output terminals with said resistor connected to the positive output terminal;
a first transistor of NPN type having its base connected to the junction of said first and second resistors and its emitter connected to the junction of said third resistor and said zener-diode, the collector of said transistor being connected through a fourth resistor to a positive terminal of said source of unregulated D.C. voltage;
a second transistor of NPN type having its base connected to the collector of said first transistor, its emitter connected to said positive output terminal, and its collector connected through a fifth resistor to said positive terminal of said source of unregulated D.C. voltage;
a third transistor of PNP type having its base connected to the collector of said second transistor, its collector connected to the emitter of said second transistor, and its emitter connected to a positive terminal of said source of unregulated D.C. voltage;
a controlled rectifier of NPNP type having its cathode connected to the negative terminal of said source of unregulated D.C. voltage, and its anode connected to the collector of said first transistor;
switch means connected in series with the anode-cathode current path of said controlled rectifier to open momentarily said current path;
a current sensing resistor connected in series between the cathode of said controlled rectifier and the negative output terminal of said power supply, the control electrode of said rectifier being connected to the negative output terminal of said power supply;
a second diode having substantially the same conducting voltage drop as the anode-to-cathode voltage drop of said controlled rectifier, connected in series with said current sensing resistor between the cathode of said controlled rectifier and the negative terminal of said power supply;
a potentiometer connected with its fixed terminals between the cathode of said controlled rectifier and the negative output terminal of said power supply;
and a seventh resistor connected between the control electrode of said controlled rectifier and the movable contact of said potentiometer.

11. In combination:
a power supply having a regulated output D.C. voltage, including a pair of output terminals and a source of unregulated D.C. voltage;
first and second resistors connected in series across said output terminals;
a third resistor and a zener-diode connected in series across said output terminals with said resistor connected to the positive output terminal;
a first transistor of NPN type having its base connected to the junction of said first and second resistors and its emitter connected to the junction of said third resistor and said zener-diode, the collector of said transistor being connected through a fourth resistor to a positive terminal of said source of said unregulated D.C. voltage;
a second transistor of NPN type having its base connected to the collector of said first transistor, its emitter connected to said positive output terminal, and its collector connected through a fifth resistor to said positive terminal of said source of unregulated D.C. voltage;
a third transistor of PNP type having its base connected to the collector of said second transistor, its collector connected to the emitter of said second transistor, and its emitter connected to a positive terminal of said source of unregulated D.C. voltage;
a controlled rectifier of NPNP type having its cathode connected to the negative terminal of said source of unregulated D.C. voltage, and its anode connected to the collector of said first transistor;
switch means connected in series with the anode-cathode current path of said controlled rectifier to open momentarily said current path;
a current sensing resistor connected in series between the cathode of said controlled rectifier and the negative output terminals of said power supply, the control electrode of said rectifier being connected to the negative output terminal of said power supply;
a fourth transistor of PNP type, connected with its collector to the control electrode of said controlled rectifier and its emitter to the positive end of said current sensing resistor;
a seventh resistor connected between the control electrode and the cathode of said controlled rectifier;
a potentiometer connected with its fixed terminals in parallel to said current sensing resistor;
an eighth resistor connected in series between the movable terminal of said potentiometer and the base of said fourth transistor;
and a capacitor connected between the base and emitter of said fourth transistor.

12. In combination:
a power supply having a regulated output D.C. voltage, including a pair of output terminals and a source of unregulated D.C. voltage;
first and second resistors connected in series across said output terminals;
a third resistor and zener-diode connected in series across said output terminals with said resistor connected to the positive output terminal;
a first transistor of NPN type having its base connected to the junction of said first and second resistors and its emitter connected to the junction of said third resistor and zener-diode, the collector of said transistor being connected through a fourth resistor to a positive terminal of said source of unregulated D.C. voltage;
a second transistor of NPN type having its base connected to the collector of said first transistor, its emitter connected to said positive output terminal, and its collector connected through a fifth resistor to said positive terminal of said source of unregulated D.C. voltage;
a third transistor of PNP having its base connected to the collector of said second transistor, its collector connected to the emitter of said second transistor, and its emitter connected to a positive terminal of said source of unregulated D.C. voltage;
a controlled rectifier of NPNP type having its cathode connected to the negative terminal of said source of unregulated D.C. voltage, and its anode connected to the collector of said first transistor;
switch means connected in series with the anode-cathode current path of said controlled rectifier to open momentarily said current path;
a current sensing resistor in the positive lead of said power supply, connected between the junction of the emitter of said second transistor and the collector of said third transistor, and the positive terminal of said power supply;
a fourth transistor of PNP type, connected by its emitter to the emitter of said second transistor and by its collector in series with seventh and eighth resistors to the negative terminal of said power supply;
the control electrode of said controlled rectifier being connected to the junction of said seventh and eighth resistors;
a potentiometer, connected by its fixed terminals in parallel with said current sensing resistor;
the base of said fourth transistor being connected in series with a ninth resistor to the movable terminal of said potentiometer;
and a capacitor connected between the emitter and base of said fourth transistor.

13. In combination:
a power supply having a regulated output D.C. voltage, including a pair of output terminals and a source of unregulated D.C. voltage;
first and second resistors connected in series across said output terminals;
a third resistor and a zener-diode connected in series across said output terminals with said resistor connected to the negative output terminal;
a first transistor of PNP type having its base connected to the junction of said first and second resistors and its emitter connected to the junction of said third resistor and said zener-diode, the collector of said transistor being connected through a fourth resistor to a negative terminal of said source of unregulated D.C. voltage;
a second transistor of PNP type having its base connected to the collector of said first transistor, its emitter connected to said negative output terminal, and its collector connected through a fifth resistor to said negative terminal of said source of unregulated D.C. voltage;
a third transistor of NPN type having its base connected to the collector of said second transistor, its collector connected to the emitter of said second transistor, and its emitter connected to a negative terminal of said source of unregulated D.C. voltage;
a controlled rectifier of PNPN type having its anode connected to the positive terminal of said source of unregulated D.C. voltage and its cathode connected to the collector of said first transistor;
switch means connected in series with the anode-cathode current path of said controlled rectifier to open momentarily said current path;
a current sensing resistor connected in series between the anode of said controlled rectifier and the positive output terminal of said power supply, the control electrode of said rectifier being connected to the positive output terminal of said power supply.

14. A device as recited in claim 13 and further comprising:
a second diode, having a conducting voltage drop which is substantially equal to the conducting anode-cathode voltage drop of said controlled rectifier, connected in series with said current sensing resistor between the anode of said controlled rectifier and the positive output terminal of said power supply.

15. A device as recited in claim 13 and further comprising:
a second diode having substantially the same conducting voltage drop as the conducting anode-to-cathode voltage drop of said controlled rectifier, connected with its anode to the collector of said first transistor and to the base of said transistor and with its cathode to the cathode of said controlled rectifier and to said fourth resistor.

16. A device as recited in claim 13 and further comprising:
a second diode having substantially the same conducting voltage drop as the anode-to-cathode voltage drop of said controlled rectifier, connected in series with said current sensing resistor between the anode of said controlled rectifier and the positive terminal of said power supply;
a potentiometer connected with its fixed terminals between the anode of said controlled rectifier and the positive output terminal of said power supply;
and a seventh resistor connected between the control electrode of said controlled rectifier and the movable contact of said potentiometer.

17. A device as recited in claim 13 and further comprising:
a fourth transistor NPN type, connected with its collector to the control electrode of said controlled rectifier and its emitter to the negative end of said current sensing resistor;
a seventh resistor connected between the control electrode and the anode of said controlled rectifier;
a potentiometer connected with its fixed terminals in parallel to said current sensing resistor;
an eighth resistor connected in series between the movable terminal of said potentiometer and the base of said fourth transistor;
and a capacitor connected between the base and emitter of said fourth transistor.

18. In combination:
a power supply having a regulated output D.C. voltage, including a pair of output terminals and a source of unregulated D.C. voltage;
first and second resistors connected in series across said output terminals;
a third resistor and a zener-diode connected in series across said output terminals with said resistor connected to the negative output terminal;
a first transistor of PNP type having its base connected to the junction of said first and second resistors and its emitter connected to the junction of said third resistor and said zener-diode, the collector of said transistor being connected through a fourth resistor to a negative terminal of said source of unregulated D.C. voltage;
a second transistor of PNP type having its base connected to the collector of said first transistor, its emitter connected to said negative output terminal, and its collector connected through a fifth resistor to said negative terminal of said source of unregulated D.C. voltage;
a third transistor of NPN type having its base connected to the collector of said second transistor, its collector connected to the emitter of said second transistor, and its emitter connected to a negative terminal of said source of unregulated D.C. voltage;
a controlled rectifier of PNPN type having its anode connected to the positive terminal of said source of unregulated D.C. voltage, and its cathode connected to the collector of said first transistor;
switch means connected in series with the anode-cathode current path of said controlled rectifier to open momentarily said current path;
a current sensing resistor in the negative lead of said power supply, connected between the junction of the emitter of said second transistor and the collector of said third transistor, and the negative terminal of said power supply;
a fourth transistor of NPN type, connected by its emitter to the emitter of said second transistor and by its collector in series with seventh and eighth resistors to the positive terminal of said power supply;

the control electrode of said controlled rectifier being connected to the junction of said seventh and eighth resistors;

a potentiometer, connected by its fixed terminals in parallel with said current sensing resistor;

the base of said fourth transistor being connected in series with a ninth resistor to the movable terminal of said potentiometer;

and a capacitor connected between the emitter and base of said fourth transistor.

References Cited by the Examiner

UNITED STATES PATENTS

| | | | |
|---|---|---|---|
| 2,974,270 | 3/61 | Christiansen | 323—22 |
| 3,084,338 | 4/63 | Mauer et al. | 307—88.5 |
| 3,096,475 | 7/63 | Brooks | 317—33 X |

FOREIGN PATENTS 1,072,714   1/60   Germany.

SAMUEL BERNSTEIN, Primary Examiner.

MAX L. LEVY, Examiner.